United States Patent [19]

Hajnal

[11] Patent Number: 4,580,886
[45] Date of Patent: Apr. 8, 1986

[54] ROTATABLE SNORKEL SYSTEM

[76] Inventor: Stephen Hajnal, 5600 Riverdale Ave., Bronx, N.Y. 10471

[21] Appl. No.: 626,403

[22] Filed: Jun. 29, 1984

[51] Int. Cl.$^4$ .............................................. G03B 17/48
[52] U.S. Cl. ..................................... 354/79; 350/502; 350/540; 352/94; 358/225
[58] Field of Search .................. 354/79; 350/502, 540; 358/225; 352/94

[56] References Cited

U.S. PATENT DOCUMENTS

| | | | |
|---|---|---|---|
| 3,994,288 | 11/1976 | Stumpf | 354/79 X |
| 4,192,591 | 3/1980 | Yobaccio | 354/79 X |
| 4,195,922 | 4/1980 | Hajnal | 354/79 |
| 4,222,653 | 9/1980 | Beiser | 354/79 X |
| 4,235,541 | 11/1980 | Jamel | 354/79 |
| 4,375,913 | 3/1983 | Hajnal | 354/79 |

FOREIGN PATENT DOCUMENTS

| | | | |
|---|---|---|---|
| 56-5519 | 1/1981 | Japan | 354/79 |
| 1286355 | 8/1972 | United Kingdom | 354/79 |

Primary Examiner—A. A. Mathews
Attorney, Agent, or Firm—Jacobs & Jacobs

[57] ABSTRACT

A snorkel camera system that has a prime lens connected to one end of the housing and a camera body connected to the other end of the housing, the optical axis of the prime lens and of the camera body being offset and parallel, and the housing is detachably mounted to the camera body such that the housing can be rotated about the camera body to a desired position and locked in place, the optical system being such that the image seen in the viewfinder maintains the correct attitude regardless of the position to which the prime lens is rotated.

6 Claims, 2 Drawing Figures

U.S. Patent    Apr. 8, 1986    4,580,886

ROTATABLE SNORKEL SYSTEM

The present invention relates to a snorkel camera system.

The present invention is an improvement in the snorkel camera system of my U.S. Pat. No. 4,375,913, issued Mar. 8, 1983. In that patent, the snorkel camera system had two lenses of specified design to permit the use of a super 8 mm format camera lens as the prime lens in combination with a 35 mm format or videotape camera body. The present system uses a different optical and mechanical system than my previous snorkel camera system to permit pictures to be taken with the optical axis of the prime lens parallel to the optical axis of the eyepiece of the camera. My new invention enables the user to swing the prime lens to any one of several positions while maintaining the correct attitude of the image seen in the viewfinder of the camera. All of this is accomplished with the ability to use interchangeable lenses and even zoom lenses.

Figure 1:
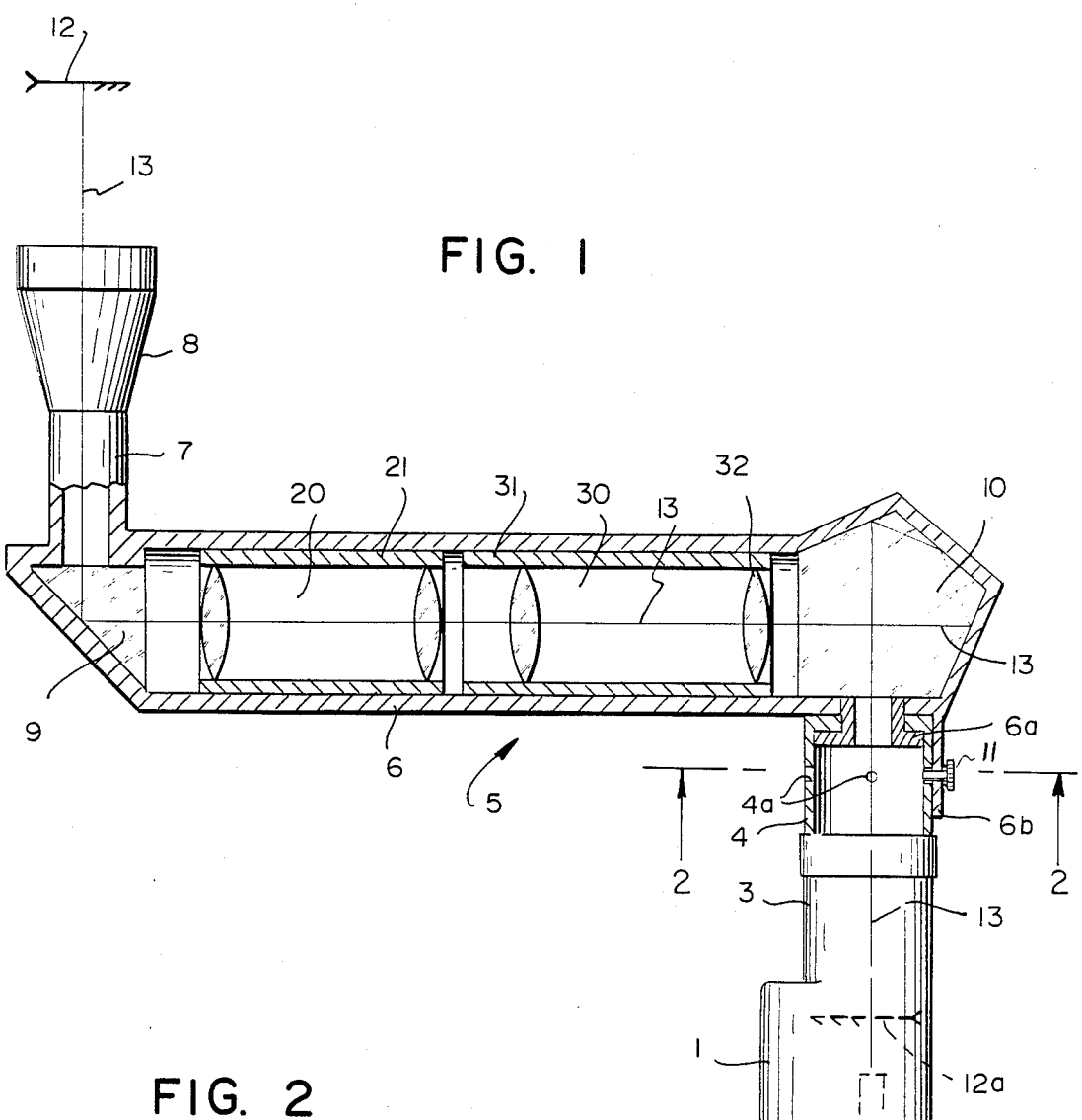
Figure 2:
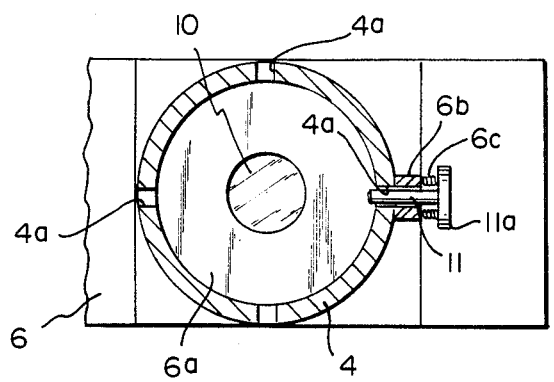

The present invention is illustrated in terms of a preferred embodiment in the accompanying drawing, in which:

FIG. 1 is a diagrammatic view, partly in section, of the camera snorkel system of the invention; and FIG. 2 is a view, in section, along lines 2—2 of FIG. 1.

The drawing shows the snorkel system of the invention, comprising a camera body 1, having an eyepiece 2 and a lens mount 3, connected to a mounting ring 4, of a snorkel assembly 5. Camera body 1 has the usual electronics or film or videotape advancing mechanism (not shown) and is a fully operational television, videotape, motion picture or still camera minus the camera lens itself. Mounting ring 4 is fixedly secured to the lens mount 3 in a conventional manner, such as by screw-in or bayonet mounting.

The snorkel assembly 5 includes a tubular housing 6 having a lens mount 7 at the end remote from camera body 1. Lens 8, such as a zoom lens or other lens of desired optical characteristics,is mounted to lens mount 7 in a conventional manner. Adjacent lens mount 7 is a 90° prism 9, and compound lenses 20 and 30 are located between prism 9 and mounting ring 4. Compound lenses 20 and 30 are shown diagrammatically with only the front and rear elements drawn in solid line. Penta-prism 10 is located immediately following compound lens 30 to complete the optional elements of the snorkel assembly 5.

Mounting ring 4 is carried by support member 6a, which is fixedly secured to housing 6, as by screw threads or the like. Pin 11 passes through an arm 6b extending from housing 6 and thence through one of the apertures 4a in mounting ring 4. Spring 6c (FIG. 2) is secured to the head 11a of pin 11 and to the arm 6b and urges the head 11a into engagement with the arm 6b. Apertures 4a are spaced around the axis of ring 4, and four apertures 4a are shown, spaced 90° apart. Usually this will be sufficient, but more or less apertures may be used. When pin 11 is pulled out of aperture 4a, the snorkel assembly 5 is free to rotate relative to the mounting ring 4 about the axis of mounting ring 4. Since ring 4 is fixedly secured to the camera body 1, the snorkel assembly 5 may thus be rotated relative to the camera body 1, as well. Insertion of pin 11 into aperture 4a locks the snorkel assembly 5 in place.

The operation of the snorkel system of the invention is as follows. The object 12 to be photographed is viewed through the lens of eyepiece 2 and the optical path 13 of the snorkel system is through lens 8, 90° prism 9, lenses 20 and 30, penta-prism 10 to the eyepiece 2 of camera body 1. Camera body 1 is provided with conventional beam splitter means (not shown) to transmit the image of object 12 onto a film (not shown) and a viewing screen (not shown), as is common for single lens reflex cameras. The image transmitted to the film plane is image 12a, i.e. an upside down and reversed image. Eyepiece 2 transmits the image 12a seen on the viewing screen to the eye, and the eye "sees" an image identical to object 12, not its mirror image. Since snorkel systems are often used in tight quarters, it is necessary to avoid viewing mirror images through eye-piece 2, since this would be confusing.

It is an important feature of the invention that the camera man can use the camera 1 with the snorkel system 5 attached thereto without any change in viewing attitude. That is, the lens 8 and the eyepiece 2 are parallel, and the camera 2 will "see" whatever is directly in front of it. This is to be contrasted with prior art snorkel systems, where the axis of the prime lens is perpendicular to the axis of the camera. A camera man using a 90° snorkel of the prior art will have to learn new shooting techniques, whereas the snorkel of the present invention can be used immediately, with no old habits to break.

Another important feature of the invention, is that the lens 8 can be rotated to any one of the positions provided by apertures 4a with respect to the camera 1 without any change in the attitude of the image 12a viewed through eyepiece 2; a tree will always be seen with leaves above the ground through a full 360° revolution of the lens 8 around the camera body 1. This means that the camera man can hide behind an object and swing the lens 8 to the left, the right, above or below and still see an image disposed in the "correct" attitude.

Another important advantage of the present invention is the ability to interchange prime lenses. With the prisms 9 and 10 being internal of the system, the need for an external mirror to erect the image seen in the viewfinder is eliminated. In consequence thereof, the camera lens 8 may be easily replaced by another lens simply by detaching it from lens mount 7. Either screw-in or bayonet mounting may be employed for lens mount 7, as desired.

Camera body 1 may be a still or motion picture film camera, a television camera or a videotape camera. The snorkel system 5 is readily attached to the lens mount 3 of a television or videotape camera 1, which is then employed in the normal manner. Alternatively, a television or videotape camera (not shown) can be attached directly to the eyepiece of a 35 mm body. It will be appreciated that lenses 20, 30 will be located in the housing 6 in the proper focus position depending upon whether camera body 1 is a 35 mm format camera or a television or videotape camera.

Camera body 1 will generally be a 35 mm format still or motion picture camera or a television or videotape camera having about the same size format. Preferably, lens 8 will be a 16 mm format lens, such as a 16 mm format zoom lens, although an 8 mm format lens or a 35 mm format lens can be used as lens 8. When an 8 mm format or 16 mm format lens is used as lens 8, the lens system 8, 20, 30 provides the 35 mm format or videotape camera body 1 with a high resolution image that is characteristic of the smaller format lens 8, but with the image enlarged to the 35 mm (or ¾inch or 1 inch videotape) format size. This is accomplished at a depth of field that is far beyond that which could have been predicted. Thus, when lens 8 is a super 8 mm format, 6 mm to 80 mm zoom lens, f4 and f22, a depth of field of one inch to infinity is obtained using a 35 mm format camera body mount. While some light is lost through prism 9 and lenses 20 and 30 of about two stops, this loss is insignificant as compared to the increase in resolution and the phenomenal increase in depth of field.

If lens 8 is of the same format as the camera body 1, then lenses 20 and 30 will comprise a simple relay lens system. If lens 8 is of smaller format than the camera body 1, as described above, then lenses 20 and 30 are chosen to enlarge the image obtained from the 8 mm format lens 8 to accommodate the larger image size of the larger format camera body 1, while meeting the requirement that the image seen by the eye through eyepiece 2 is erect and non-reversed. For an 8 mm format lens 8, lens 20 will be a 58 mm focal length, 35 mm format lens with the front 21 facing prism 10 and the rear 22 facing prism 9, and lens 30 will be a 200 mm focal length, 35 mm format lens with the front 31 facing prism 9 and the rear 32 facing prism 10. When lens 8 is a 16 mm format lens, then lens 20 will be a 100 mm focal length, 35 mm format lens and lens 30 will be a 150 mm focal length, 35 mm format lens with the front 21, 31 of each lens facing each other as described above.

Lenses 20, 30 can be disposed in a light path with either end being upstream, but one of the two positions will provide a greater magnification, $m=p/q$ where m is the magnification and p and q are the object and image distances, respectively. As used herein, the "front" and "rear" of lenses 20, 30 refers to the upstream and downstream ends, respectively, when the lens 20, 30 is in the position that provides the greater magnification. Thus, in FIG. 1, lens 30 is disposed in the light path in its "normal" position to provide a greater magnification, while lens 20 is "reversed" and will provide a lesser magnification than if disposed in its normal position.

I claim:

1. A snorkel camera system comprising a camera body means having a camera housing with a light admitting opening therein, means for recording images transmitted through said light admitting opening, and an eyepiece having a lens therein for viewing the object being photographed; an elongated hollow housing means having one end arranged for light entry and the other end for light egress, and camera mounting means connected to the light-egress end of said housing means for detachably mounting said camera body means at said light admitting opening; a prime lens detachably secured to the light entry end of said housing means and facing in the same direction as said light admitting opening and optical means for providing an optical path from said prime lens through said hollow housing means to and through the light admitting opening of said camera body means, said optical means comprising a 90° prism means in said housing means adjacent said light entry end and operable to turn said optical path through an angle of 90°, a penta prism means adjacent said light egress end and having a first face disposed toward said 90° prism means and a second face perpendicular to said first face and disposed toward said light admitting opening of said camera body means, said penta prism means being operable to turn said optical path through an angle of 90°, whereby an erect non-reversed image of the object is viewed through said eyepiece; and connector means carried by said housing means at said light egress end for connecting said camera mounting means to said housing means, said connector means comprising tubular means having one end connected to said housing means at said light egress end, said camera mounting means being connected to said tubular means, said optical path passing from said penta prism means to said camera body means via said tubular means, said tubular means and said camera mounting means having cooperating members operable to allow said housing means to be rotated relative to said camera mounting means while said camera mounting means remains connected to said tubular means.

2. Apparatus according to claim 1, wherein said camera body means is a 35 mm format motion picture camera body.

3. Apparatus according to claim 1, wherein said camera body means is a television camera or a videotape camera body.

4. Apparatus according to claim 2, wherein said prime lens is an 8 mm or 16 mm format lens and said optical means comprises lens means between said prism means for enlarging the image transmitted by said prime lens means.

5. Apparatus according to claim 3, wherein said prime lens is an 8 mm or 16 mm format lens and said optical means comprises lens means between said prism means for enlarging the image transmitted by said prime lens means.

6. Apparatus according to claim 1, wherein locking means is provided to lock said camera mounting means in a desired position with respect to said housing means.

* * * * *